Nov. 20, 1951  J. HANDLEY  2,575,872
CAM AND PAWL ACTUATED TENS TRANSFER DEVICE
Filed Jan. 22, 1947  7 Sheets-Sheet 1

Inventor:
John Handley
by Pennie, Edmonds, Morton and Barrows
Attorneys

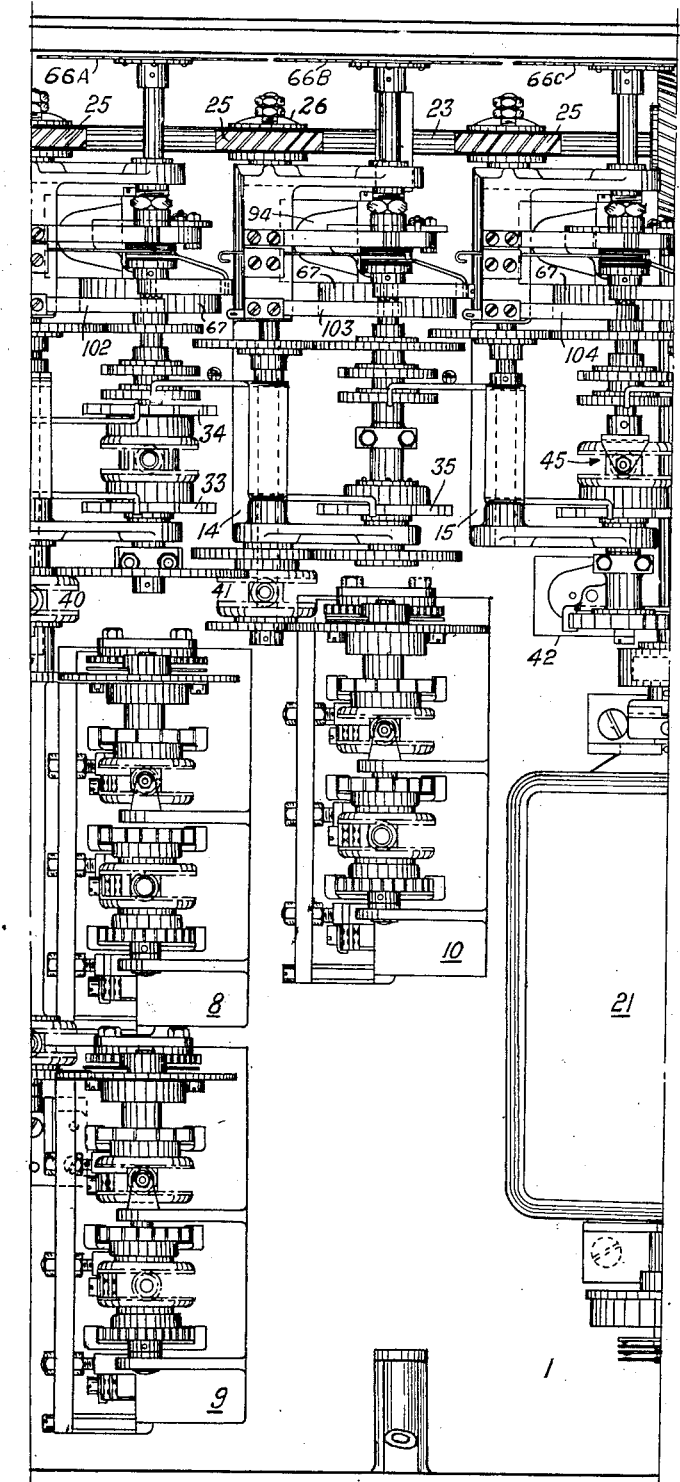
FIG. 1⁶.

Nov. 20, 1951  J. HANDLEY  2,575,872
CAM AND PAWL ACTUATED TENS TRANSFER DEVICE
Filed Jan. 22, 1947  7 Sheets-Sheet 4
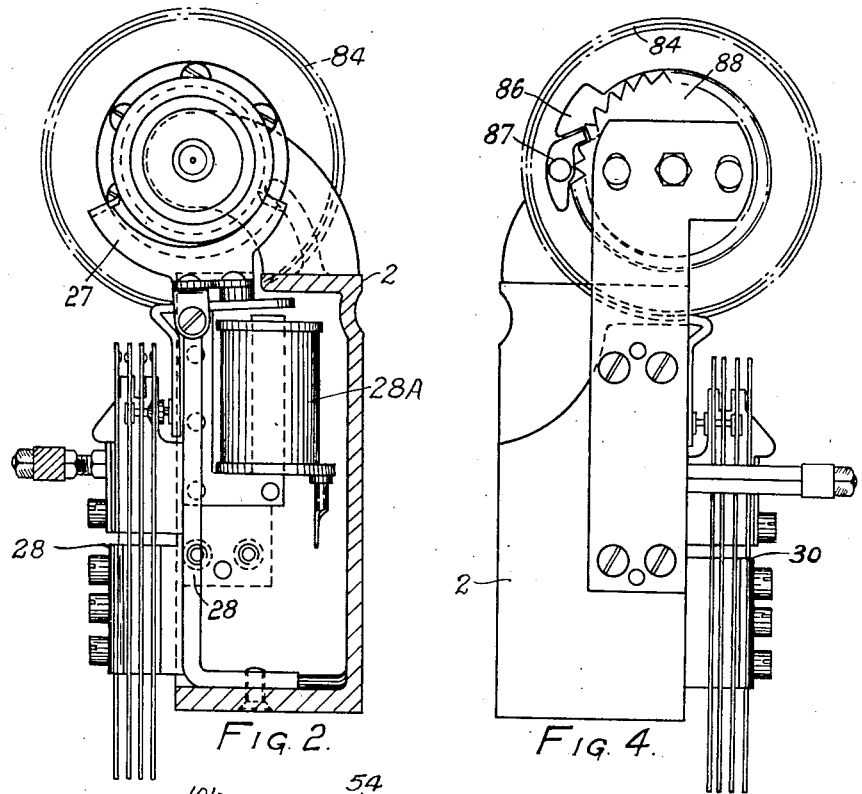
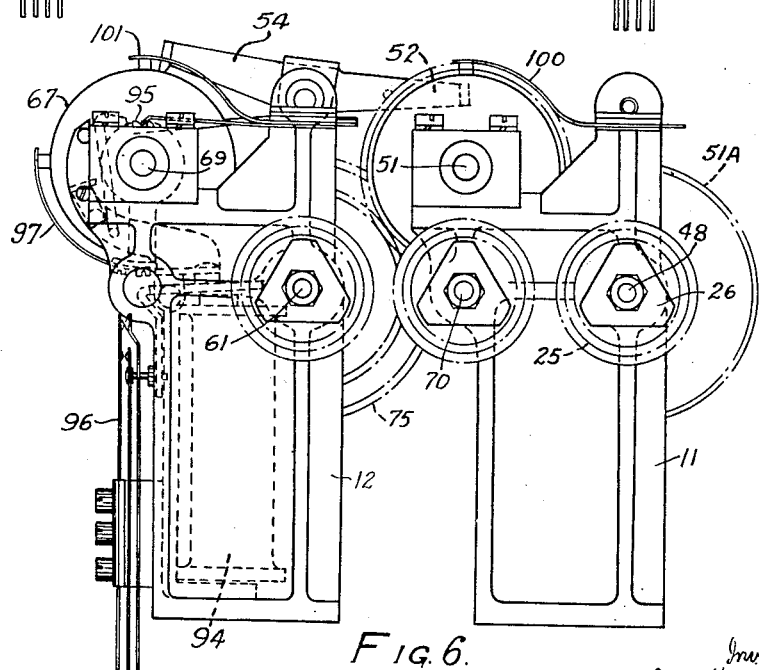

Nov. 20, 1951  J. HANDLEY  2,575,872
CAM AND PAWL ACTUATED TENS TRANSFER DEVICE
Filed Jan. 22, 1947  7 Sheets-Sheet 5

Inventor:
John Handley
by
Pennie, Edmonds, Morton and Barrows
Attorneys

Nov. 20, 1951  J. HANDLEY  2,575,872
CAM AND PAWL ACTUATED TENS TRANSFER DEVICE
Filed Jan. 22, 1947  7 Sheets-Sheet 6

Inventor:
John Handley
by Pennie, Edmonds, Morton and Barrows
Attorneys

Nov. 20, 1951   J. HANDLEY   2,575,872
CAM AND PAWL ACTUATED TENS TRANSFER DEVICE
Filed Jan. 22, 1947   7 Sheets-Sheet 7

Inventor:
John Handley
by
Pennie, Edmonds, Morton and Barrows
Attorneys

Patented Nov. 20, 1951

2,575,872

UNITED STATES PATENT OFFICE 2,575,872

CAM AND PAWL ACTUATED TENS TRANSFER DEVICE

John Handley, London, England, assignor to The Union Totalisator Company, Limited, Glasgow, Scotland, a corporation of Great Britain Application January 22, 1947, Serial No. 723,532
In Great Britain November 1, 1944

Section 1, Public Law 690, August 8, 1946
Patent expires November 1, 1964

5 Claims. (Cl. 235—134)

This invention refers to a counting machine the denomination spindles of which are biased in their rotation by slipping clutches or by other means when released by electrically and mechanically operated escapements, and consists of means whereby, when a lower denomination spindle has reached ten and transfers one unit to the next higher denomination spindle, sufficient time is allowed for the transfer to take place even though the machine is operating at a very high speed.

Each denomination spindle counts forty per revolution, that is, from 0 to 9 four times; therefore, four transfers take place for every revolution of the next lower denomination spindle if said next lower denomination spindle is counting in "tens."

The escapment wheels mounted on a denomination spindle and which accept the transfers are each controlled by two separate escapement levers, of which one lever is always waiting to check the movement of the escapement wheel when the other is released. If the escapement wheel is to make forty steps per revolution, it will contain twenty teeth and one escapement lever will check on a tooth approximately opposite it when the wheel has rotated half a pitch, so that the lever which has just released it may return to midposition ready to check when the other lever releases.

These levers are urged by springs and bear on two cams on the next lower denomination spindle. These two cams are each cut with two drops 180° apart and the cams are arranged on the spindle so that the drops in the two cams alternate at 90° apart. Each cam is cut to give a quick drop at the point where zero reaches the respective lever and allow the respective lever to remain down, releasing the escapement wheel until five has been counted; from five to ten the cam steadily lifts so that at ten, when the next zero is showing, the escapement lever has fully lifted on the cam and is in position to check the escapement wheel again. The cams have then rotated 90°. At this 90° point the second cam drops its escapement lever, allowing the escapement wheel to move again during the next 90° movement. The cams have then turned 180°, and the first cam at this point releases the escapement wheel for a third transfer. The second cam releases the wheel again at 270° for the fourth transfer, and so on.

It should be understood that in this way if the lower denomination spindle is moving at high speed, a period of five units may be taken while the lever drops and five while it is lifted; that is, ten times the normal transfer time is allowable.

Should still higher speed be required, two escapement wheels coupled by a differential gear may be employed and actuated by two cams and four levers. Then a quarter of a revolution or ten units may be allowed for each lever to drop and ten units to lift, that is, twenty units for each complete transfer operation.

Thus, if four hundred units per second are being accepted, these may be all transferred to tens, and each transfer movement will have a tenth of a second in which to operate.

The invention further concerns means for checking backlash and relieving stresses on escapement wheels, where differential trains of gears are employed. With these objects in mind, a coiled spring drive is interposed about mid-way or at a convenient position in the differential train so that a sub-group of differential gearing is driven by the spring, tension being maintained in the spring by the slipping clutch drive. The spring-urged sub-unit carries with it (when released to rotate by the escapement on the ratchet wheels) a trapping plate, and a pawl on the sub-unit driving gear which is locked into a fixed ratchet wheel by the trapping plate each time the driving wheel has made up the rotary movement released by the escapements. Engagement with the teeth on the fixed ratchet wheel gives a positive position for the driving gear each time movement takes place, so that error through backlash in the sub-group differentials is entirely eliminated.

Such a spring and trap plate arrangement was heretofore used to allow a stepping movement to be converted into steady rotation. In the present case a coiled spring of lower torque value is incorporated in each escapement wheel to reduce escapement operating time to a minimum.

The invention is further concerned with means to control a public indicator. A stepping magnet engaging a ratchet wheel actuating a wiper which is loosely mounted on each denomination spindle, and a disc or drum carried by the spindle and having inserts of insulating material at positions corresponding to ten steps is provided, so that the drum is stepped round until an insulated segment engages the brush, pulsing the public indicator as it steps.

Associated with each denomination spindle is also a device for restoring the counting machine to zero when required. This device consists of a lever in contact with a disc or drum on each denomination spindle, a recess being provided so that the lever drops in and changes over contacts when the denomination spindle has returned to zero, so that impulses sent to a magnet on the units spindle will be diverted to a magnet on the tens spindle when the units spindle has reached zero, and these impulses will actuate the hundreds spindle when the tens have reached zero, and so on until all the digits are zero.

A counting magnet on each of the units, tens and hundreds spindles may be used to reset these spindles, but a separate magnet will be provided on the higher denomination spindles only for the purpose of zeroising and will be connected by differential gearing to the transfer escapement wheel.

Where bets of unit value, five units value and ten units value are to be counted, a cam on the five units spindle actuates a lever bearing on an escapement wheel on a differential gear, through which passes the drive to the indicating end of the units spindle, so that the units spindle advances to five at the first step of the fives spindle and to zero at the second or even steps of the fives spindle, one step being transmitted to the tens spindle at each alternate step of the fives spindle. This differential gear is driven slowly and always follows up to the correct indication when the counting slows down or stops.

In the accompanying drawings forming a part of this application:

Figs. 1a, 1b and 1c, when assembled side by side, constitute a plan view of a counting machine constructed according to the invention;

Fig. 2 is a vertical sectional view through the counting unit 2 shown in Figs. 1a, 3, 4 and 5;

Fig. 3 is a front elevational view of the counting unit 2 looking from the left in Fig. 1a;

Fig. 4 is an end view of the counting unit 2 of Fig. 1a looking from the left in Fig. 3;

Fig. 6 is a front view of the part of the machine shown in Figs. 7, 8 and the upper part of Fig. 1a with the disc 66 removed;

Fig. 8 is a broken plan view, partly in horizontal section, of parts of the machine shown in Fig. 6, 7 and the upper portion of Fig. 1a;

Figure 1A:
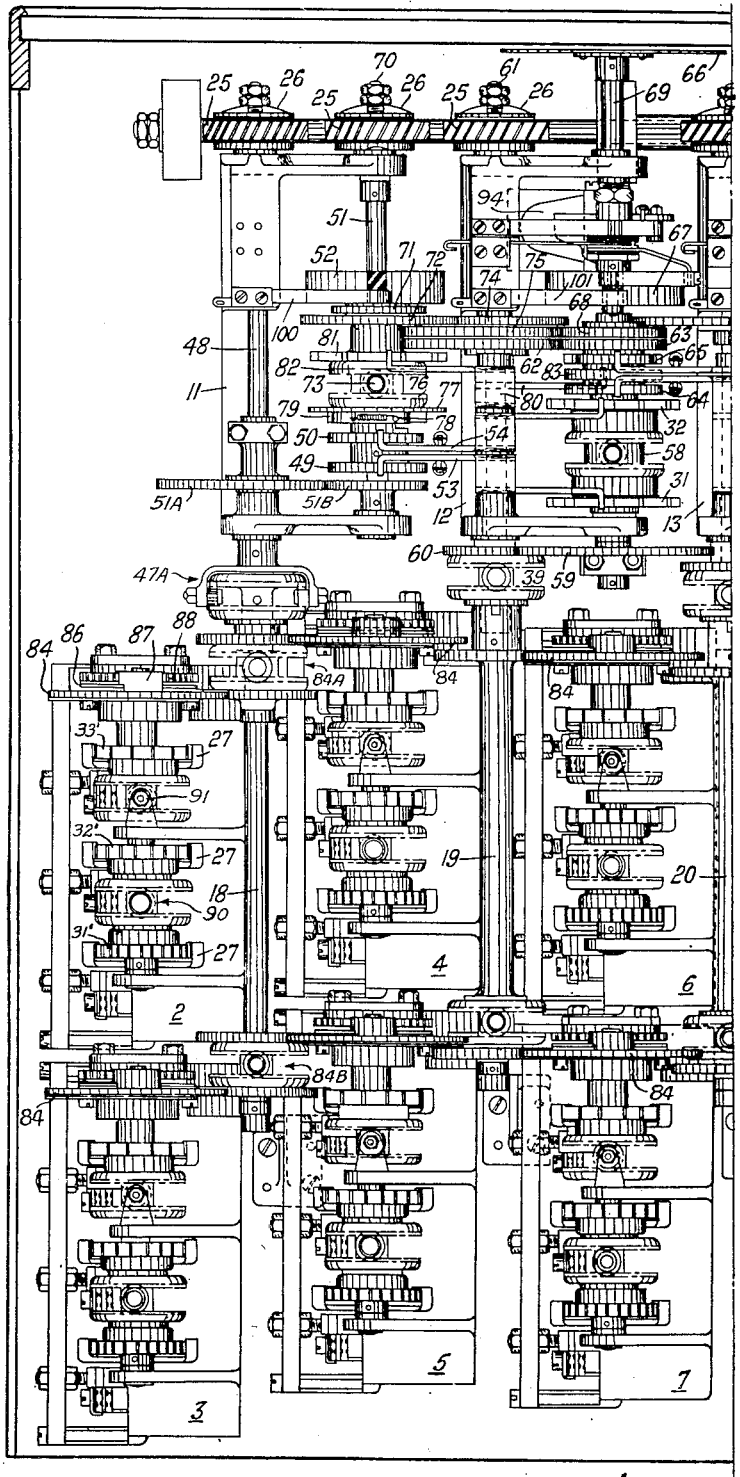
Figure 10:
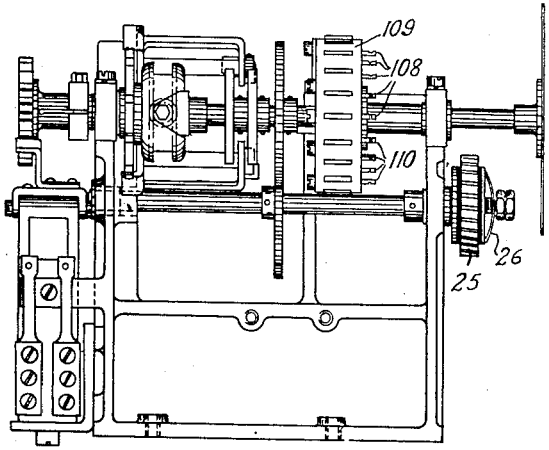
Figure 9:
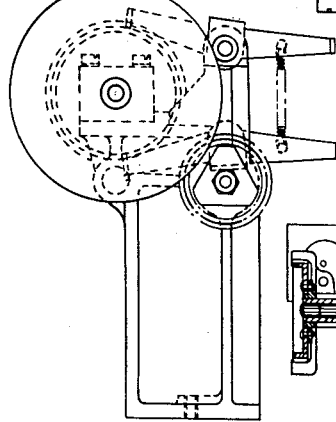
Figure 11:
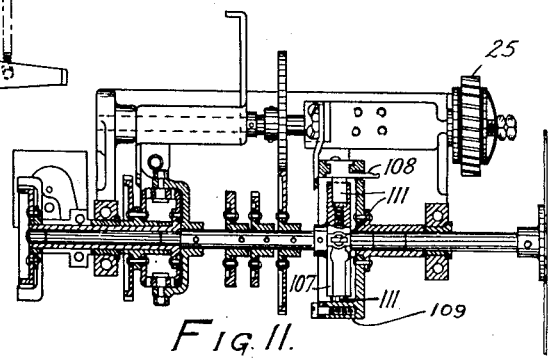
Figure 12:
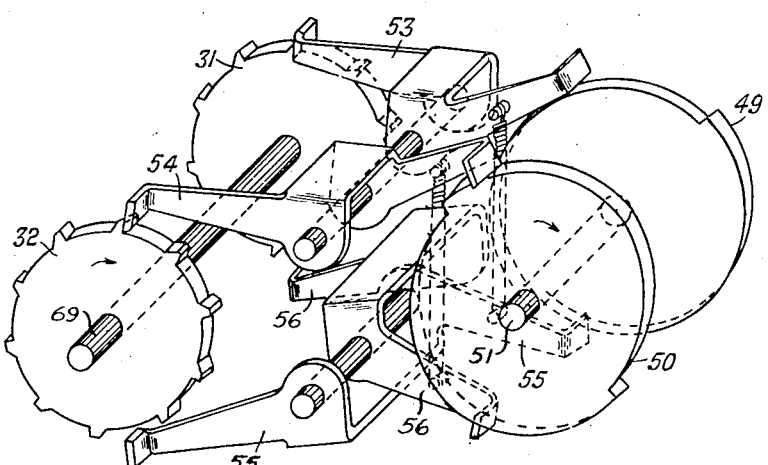

Figs. 9, 10 and 11 are views of a transmission unit provided with a modified form of indicator control, Fig. 10 being a side view, Fig. 9 a front view and Fig. 11 a plan view, partly in horizontal section, of the apparatus shown in Figs. 9 and 10; and Fig. 12 is an enlarged diagrammatic perspective view of the escapement mechanism connecting the transmission units 11 and 12 shown in Fig. 1a, drawn as viewed from the upper left hand corner of Fig. 1a.

Figure 1C:
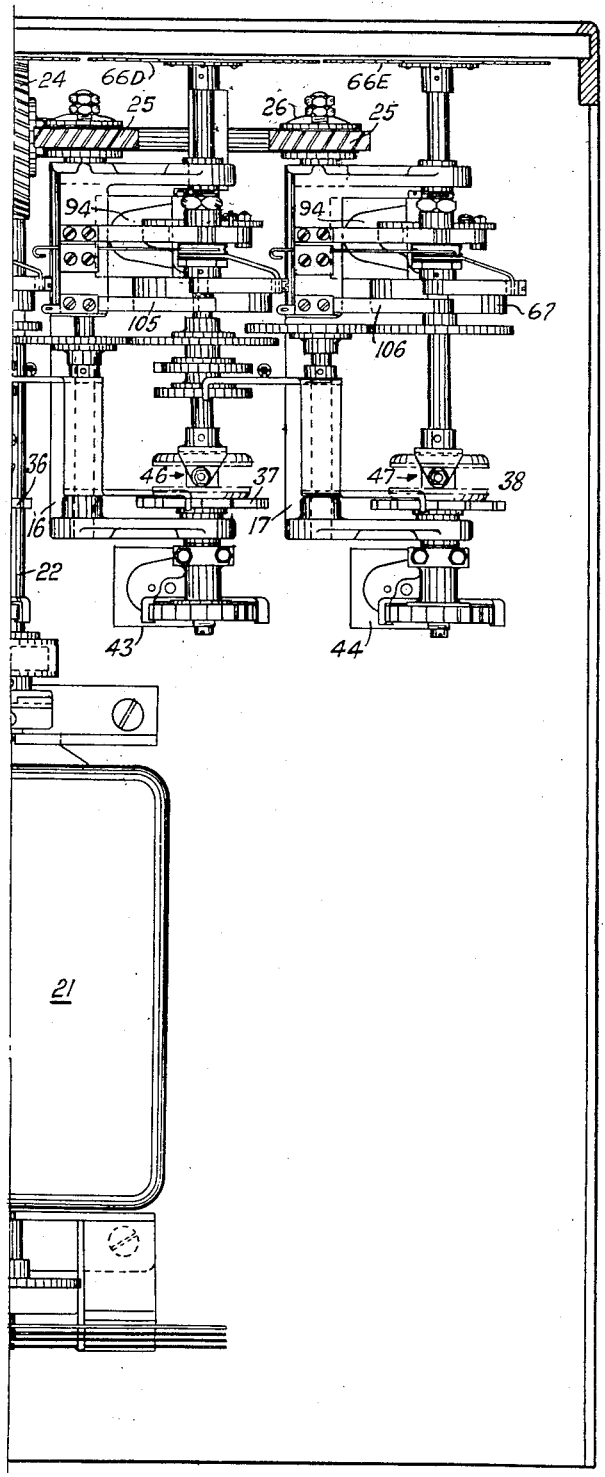
Figure 3:
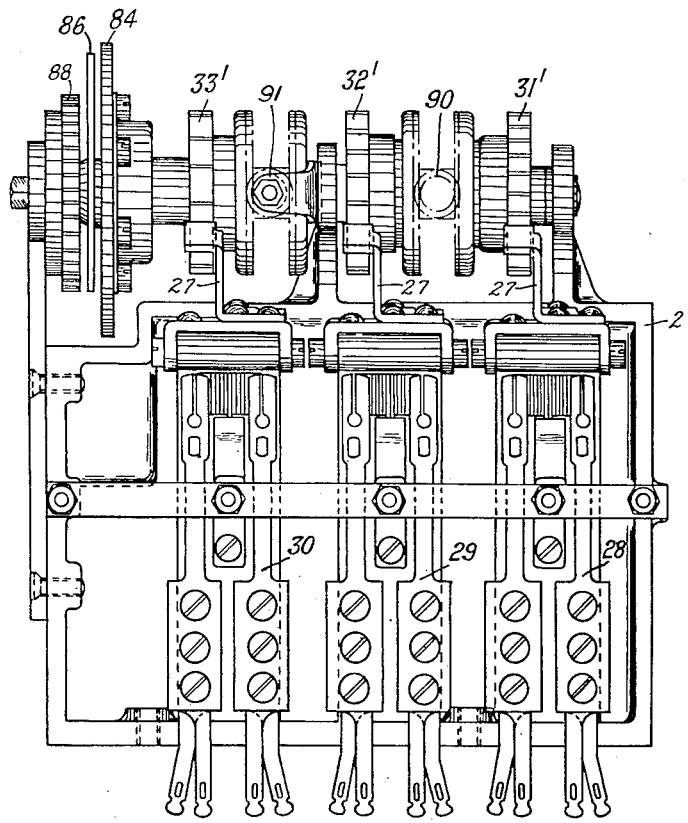
Figure 5:
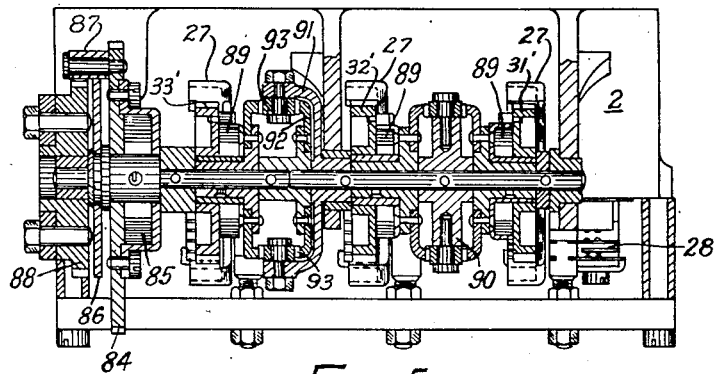
Fig. 5 is a broken view, partly in horizontal section, taken through the gearing of the counting unit 2 as seen in Fig. 3.

Figs. 1a, 1b and 1c form collectively a plan of the counting machine built on a base casting 1, and consisting of nine counting units 2, 3, 4, 5, 6, 7, 8, 9 and 10, seven transmission units 11, 12, 13, 14, 15, 16 and 17, connected to the counting units by intermediate gear shaft assemblies 18, 19 and 20, driven by a motor 21 through the motor shaft 22, which drives the main shaft 23 through a spiral gear 24, the main shaft driving the transmission gears 25 which continuously urge the drive shafts of the transmission units through friction clutches 26.

The transmission units 11 to 17 acting through the gears of the gear shaft assemblies 18, 19, 20, continuously urge the counting units 2 to 10, which rotate only when the armatures 27 of counting relays 28, 29 and 30, see Figs. 2, 3, 4 and 5, operate and release the counting ratchets 31′, 32′, and 33′. These relays of the counting units 2 to 10 receive electric impulses from ticket issuing machines in a known manner, units 2 to 5 being arranged to receive unit impulses, units 6 and 7 five-unit impulses, units 8 and 9 ten-unit impulses and unit 10 one hundred-unit impulses. On the transmission units 12 to 17 the transfer ratchet wheels 31, 32, 33, 34, 35, 36, 37 and 38 are also urged to rotate by the friction clutches 26, the drive being distributed from the friction clutches to the counting units and transfer wheels on the transmission units 12, 13 and 14 by differentials 39, 40 and 41, and to the reset relays 42, 43 and 44 by the differentials 45, 46 and 47. The spiders of the differentials are fixed to the shafts on which they are mounted, respectively, and urged to rotate by the friction clutches 26.

Figure 8:
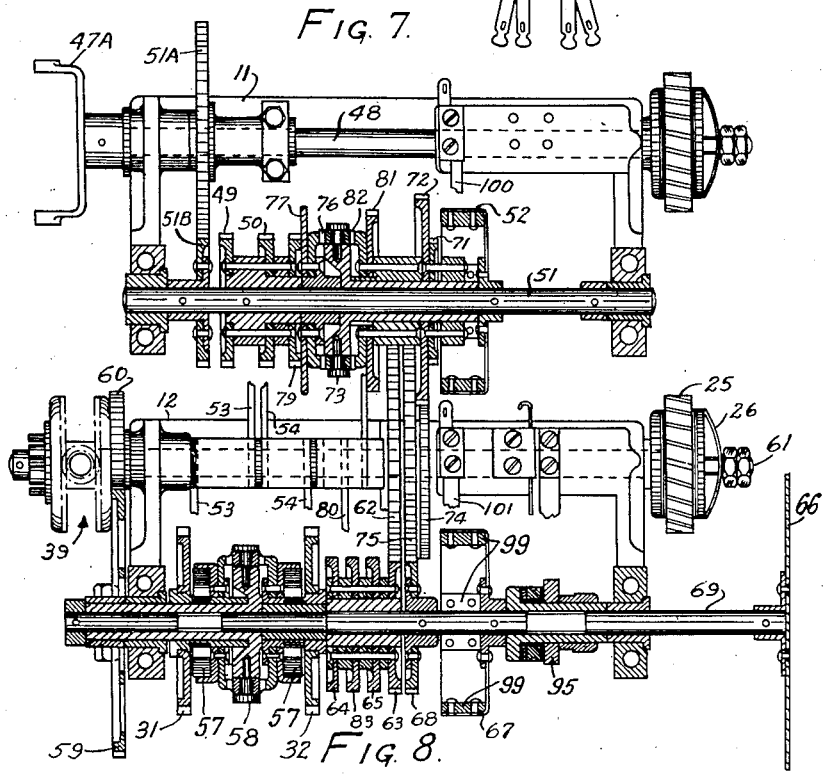

All the bets of unit value, or those received as multiples of unit value, are received from the counting units 2 to 5 through a differential gear 47A by the shaft 48 of the units transmission unit 11 which drives the transfer cams 49 and 50 on the shaft 51 carrying the drum 52, the shaft 51 being driven by gears 51A and 51B, Figs. 1a and 8. The drum 52 is only used to 'mark' the zero position for reset purposes when the counting machine is reset to zero. The gearing is such that the cams 49 and 50 rotate once for every forty units from the unit counters.

The transmission unit 12 receives bets of five units value or multiples of five units, and the cams 49 and 50 are arranged to release the ratchet wheels 31 or 32 once for every five units received by the shaft 48. There are two transfer levers 53 and 54, operating above the ratchet wheels 31 and 32, and two similar transfer levers or pawls 55 and 56 below (see Figs. 6 and 12). These ratchet wheels each have ten teeth, and the levers are so disposed that, when either an upper or a lower lever releases a tooth, the opposite lever is waiting midway between two teeth to check the ratchet wheel at the other side.

Each of the two cams 49 and 50 has two release positions, and one is advanced 90° in front of the other so that a transfer on to 31 or 32 takes place eight times per revolution of the shaft 51. The lever 53 operating above the cam 49 releases the ratchet wheel 31, and the lever 54 operating above the cam 50 releases the ratchet wheel 32, but the lever 55 operating under the cam 49, crosses over and releases the ratchet wheel 32, and the lever 56 operating below the cam 50 crosses over and releases the ratchet wheel 31, so that transfers are taken alternately by one ratchet wheel and then the other.

The cams are so shaped that ample time is allowed for the respective levers to drop and lift as the cams rotate at high speed, and one lever is always in position to check its ratchet wheel when its opposite lever is released. The springs 57, Fig. 8, allow the ratchet wheels to follow up instantly they are released, and the sum of the movements of the two ratchet wheels is combined in the differential 58, and transmitted via gears 59 and 60, through the differential gear 39, where they combine with the movements from the five units counters 6 and 7, transmitted by shaft 19, through the shaft 61, and gears 62 and 63, and rotate the transfer cams 64 and 65, which in turn transfer all five unit bets to the tens transmission unit 13.

The five units counters 6 and 7 receive five unit bets from ticket issuing machines and as such units are received the relays 28, 29 or 30 are operated to release the lower crown wheel of the differential gear 39 for rotation (Fig. 1a). This permits the spider of 39 to be rotated by the clutch 26 on shaft 61, thereby rotating gear 63 and transfer cams 64 and 65, see Fig. 8. Fig. 8 also shows how the movements of the escapement wheels 31 and 32 each release the spider of differential 58 so that their movements are combined to rotate this spider, the gears 59 and 60 and the upper crown wheel of differential 39.

The units are displayed on a disc 66 on the second transmission unit 12; see Figs. 1a, 6, 7 and 8. The disc 66 is mounted on the shaft 69 to which are fixed the units public indicator control drum 67 and driven gear 68, the other gearing on this shaft being free to rotate on the shaft.

Ten, hundreds, thousands, ten-of-thousands and hundreds-of-thousands are displayed on discs 66A to 66E, respectively.

The units disc 66 is driven at moderate speed by the friction clutch 26 on the shaft 70 (under shaft 51, Fig. 6) carrying a gear which engages the gear 71 attached to the gear 72 and differential spider 73 of a differential gear including crown wheels 76 and 82 all mounted on the shaft 51 and shown in detail in Fig. 8. The gear 72 rotates the gear 74 which is attached to a gear 75 on shaft 61, the latter gear meshing with gear 68, so that the units disc 66 and drum 67 rotate upon movement of the spider 73. The crown wheel 76 attached to the disc 77 carrying the pawl 78, rotates until the pawl 78 engages one of four teeth on a cam 79 attached to the shaft 51, when the shaft 51 slows down or comes to rest. As an odd five unit bet must also be indicated on the units disc 66 (every second five units bets being transmitted to the tens shaft), provision is made to advance the units disc 66 five units by an escapement lever 80 (Figs. 1a and 8) operating on an escapement wheel 81 attached to the crown wheel 82, this escapement lever being controlled by engagement with a cam 83 (between the cams 64 and 65 on shaft 69) which lifts it at every odd five units bet received and drops it at every even five units bet received, except when the cam 83 is rotating at high speed, when the escapement lever will "ride" on the peaks of the cam 83.

The spider 73 is controlled on one side by the crown wheel 82, attached to the escapement wheel 81, under control of the escapement lever 80, which is operated to release escapement wheel 81, by cam 83, each time a five unit bet is received from counting units 6 or 7, which transmit only five unit bets.

The cam 83 has twenty peaks on it, but each five unit bet only rotates it one-fortieth of a revolution, so that at the first step the lever 80 will rest on the top of a peak, so that the escapement wheel 81 is held, and allows the spider 73 and gears 72, 74, 75 and 68 to turn the disc 66 to register five units. The second step allows cam 83 to turn another fortieth, so that the lever 80 now rests in the root between two peaks of the cam 83 releasing wheel 81 so that it rotates, allowing disc 66 to turn another five units so that nought will be registered.

When the five unit bets are being received at high speed, the escapement wheel 81 will not respond sufficiently quickly to transmit them all to the disc 66, and the lever 80 will ride on the peaks of the cam 83 if it is spinning quickly, but as the five unit bets are also being transmitted through differential gears 39, gears 62 and 63 and transferred in tens by cams 64 and 65 to escapement wheels 33 and 34, and registered on disc 66A, they will not be lost, and a correct indication is given so long as the units disc 66 displays five when an odd number of five unit bets has been transmitted, and nought when an even number of five unit bets has been transmitted. This is taken care of by the lever 80 resting on a peak at odd bets, or dropping between two peaks at even bets, thus holding the escapement wheel 81, and displaying five on the disc 66 at odd five unit bets, or, holding ratchet wheel 81 and displaying nought at even five units bets, so that, when counting slows down or stops, all five unit bets are correctly registered.

As the machine is also accepting bets of single unit value, which are transmitted in fives to cams 64 and 65, cam wheel 79 is free to over-run the differential 39, shaft 61, and gears 62 and 63, all odd units under ten must also be indicated on disc 66, and the control spider 73 at the other side, by crown wheel 76. This ensures that all single units are correctly registered, as this is positioned by the shaft 51, to the ratchet wheel 79, engaged by pawl 78, on the disc 77, which is attached to crown wheel 76.

Here again the units will be accepted at very high speed, and the spider 73 is only urged to rotate at a low speed. The cam wheel 79 is free to over-run the disc 77 and crown wheel 76. There are four teeth on the wheel 79, and as this wheel represents forty units per revolution, any one tooth represents ten units.

Over-running the units does not represent any loss of bets, as these units are also transferred via the cams 49 and 50, to the escapement wheels 31 and 32, and, as in the case of five unit bets, when counting slows down or stops, the pawl 78 will engage one of the four teeth on the wheel 79, and hold up the spider 73 when the odd unit bets are correctly registered on the disc 66.

To demonstrate the condition when unit and five unit bets are being accepted, we shall take note of what takes place.

For example, when five single unit bets and one five unit bet have been accepted:

(a) The five single unit bets have passed through shaft 48, rotated crown wheel 76, spider 73, and disc 66, to register five units, and transferred one five unit bet from cam 49, or cam 50, to escapement 31 or escapement 32, and rotated the spider of gear 58, gears 59 and 60, differential 39, gears 62 and 63, and cams 64 and 65, so that one of these cams is half way to transferring a ten to transmission unit 13.

(b) The one five unit bet has rotated the cam 83, and the differential 39, lifted the lever 80 and released the escapement wheel 81, so that spider 73, gears 72, 74, 75 and 68, turn disc 66 another five units, so that nought is displayed; at the same time differential 39 has turned gears 62 and 63 and cams 64 and 65 another step, so that one of the escapement wheels 33 or 34 has moved and turned the tens disc 66A to display one ten, so that the five single unit bets, and the one five unit bet are now displayed as one on the tens disc 66A, and nought on the units disc 66.

To further check this movement, any number of unit bets and five unit bets, may be treated in the same way, say seventy-three unit bets, and seventeen five unit bets are counted. Seventy-three units represents fourteen five unit transfers and three odd units displayed on disc 66. Seventeen five unit bets, means the equivalent of seventeen five unit transfers, with five added to the units disc, via an escapement wheel 81, as seventeen is an odd number, so that the units disc would show three plus five, that is eight. The fourteen plus seventeen five unit transfers, that is thirty-one five units, would result in fifteen tens being transferred, with one held in store by cams 64 or 65. Of these fifteen, one would be transferred to the hundreds disc 66B, via escapement wheel 35, and therefore the machine would register one hundred and fifty eight units, which is seventeen multiplied by five, plus seventy-three.

The counting units 2 to 10 are of similar construction and each includes an output gear 84 which is urged to rotate by power transmitted from at least one of the slipping clutches 26. As an example, rotational tension applied through the shaft 48 carries through differential gear 47A to a differential gear 84A (Fig. 1a) mounted on shaft 18. The crown wheels of gear 84A are attached to gears which mesh respectively with the output gears 84 of counting units 2 and 4, as shown. Counting units 3 and 5 are similarly connected to a differential gear 84B on the lower end of shaft 19. When one of the relays 28, 29 or 30 of units 2 to 5 is impulsed the shaft 48 is released to rotate.

To reduce position errors through gear inaccuracies to a minimum and relieve stresses on the escapement wheels, at the output gear 84 of each counting unit, for example unit 2, a spring 85, trap plate 86, pawl 87 and fixed ratchet wheel 88 are used (Figs. 2, 3, 4 and 5). The gear 84 is rotated by power from one of the slipping clutches 26 against the spring, until the pawl is guided into the fixed ratchet wheel and checked against the face of a tooth on the ratchet wheel 88. There are thirty teeth on the fixed ratchet wheel, each representing one unit, and as the relays 28, 29 and 30 operate in response to impulses from ticket issuing machines, releasing the escapement wheels 31', 32' and 33', the spring 85 rotates the trap plate 86 which through the differentials follows up the movement of the escapement wheels, and lifts the pawl 87 out of the fixed ratchet wheel, allowing the output gear 84 to follow up this movement. The springs 89 are lighter than the spring 85 and allow the escapement wheels instantly to follow up the movements of the releasing armature 27. Each relay includes a solenoid such as the solenoid 28A, Fig. 2, for operating its armature 27. The output gear 84 and the escapement wheels 31' and 32' rotate in clockwise direction viewed from the output end of the counting unit, but the escapement wheel 33' rotates in counter-clockwise direction. The movement from 31' and 32' is transmitted via differential 90, spider 91 and crown wheel 92 to the trap plate 86, urged by the spring 85, and gear 84. The movement from the escapement wheel 33' is transmitted via the pinions 93 of spider 91 to the crown wheel 92 which reverses its direction, so that 33' must rotate in counter-clockwise direction.

The escapement wheels 31', 32' and 33' may have thirty, fifteen, ten or six teeth so that one operation of the relay will count one, two, three, or five units, and allow the pawl to move one, two, three, or five teeth round the fixed ratchet wheel.

Figure 7:
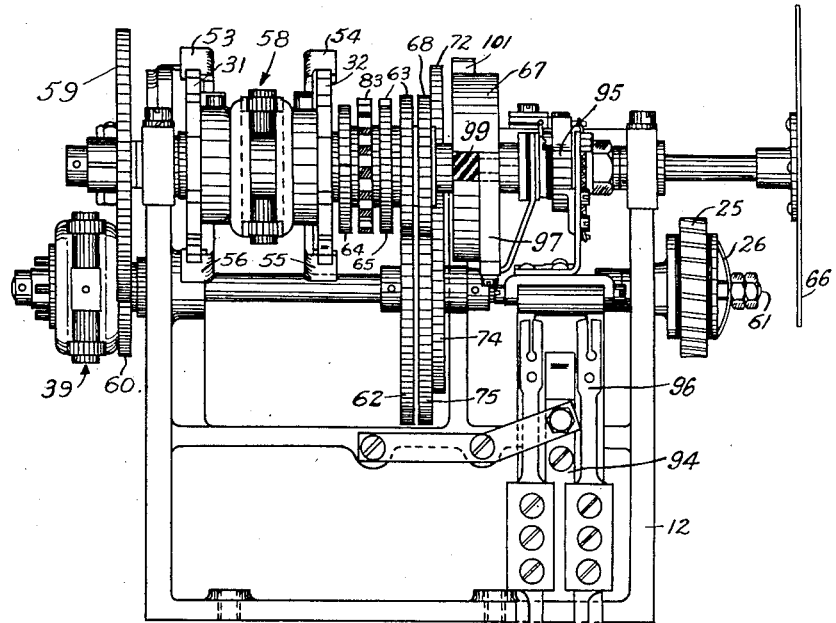
Fig. 7 is a vertical elevational view, looking from the right in Fig. 1a toward the transmission unit 12 and the disc 66, with parts removed to simplify the showing.

For the purpose of controlling a public indicator, a stepping relay 94, controlled by drum 67, Fig. 7, is provided on each transmission unit which includes a ratchet wheel 95 and operates via contacts 96 and wiper 97 to earth. This relay is wired in series with a relay on the public indicator, so that the relay 94 will operate in sequency with the indicator.

The drum 67 has four inserts of insulating material 99. The indicating disc 66 is numbered 0 to 9 four times, as these discs count forty units per revolution. The inserts are in the same angular position as the noughts, and the wiper 97 is set on an insert when nought is displayed at the top of the disc, and the public indicator is set at zero when counting commences.

As the drum rotates, the public indicator control relay 94 steps round with the appropriate public indicator digit until its wiper arrives on an insulated segment 99 when it comes to rest, until the drum moves on again, upon which the relay again operates to find the corresponding position. Each of the transmission units provided with an indicating disc is also provided with a stepping relay such as the relay 94 for operating a corresponding indicating means in a public indicator, which may be located at a considerable distance from the counting machine. The public indicator will then show the value registered on the counting machine.

To reset the counting machine to zero, a unit counting relay, for instance 28, is given ten electrical impulses a suitable source via the wiper 100 of the first transmission unit 11, stepping the drum 52 round until this wiper bears on an insulated segment. If the units drum 52 is in a position that three units are counted on it, seven of these ten impulses will be effective and the remaining three will not operate the armatures 27 as the wiper 100 will be resting on an insulated segment and the circuit broken.

The units-indicating disc 66 will then display five or nought according to whether an odd five units bet has been taken by the five units counters or not, and, to ensure that this is cleared, a single impulse is sent to one relay of the five units counters 6 or 7 to earth, via the wiper 101, which will clear this indication unless wiper 101 is already on an insulated segment of drum 67, when it will be ineffective, as before.

Ten impulses are then sent to one relay of the ten units counters 8 or 9 via the wiper 102 and then ten impulses are sent to a relay of the 100 unit counter 10 to earth via the wiper 103 to reset the discs and drums of the units 13 and 14 to zero. For the subsequent units 15, 16 and 17 ten impulses are sent to the reset relays 42, 43 and 44 and via the wipers 104, 105 and 106 to earth for the same purpose. These relays operate armatures and escapement wheels like the relays 28, etc.

As these units return to zero, the indicator control relays automatically operate until they and their corresponding public indicator digits are all at zero.

These impulses are sent from an impulsing machine through a pre-selector switch which automatically transfers them to one digit after another until all have been cleared, and takes approximately seven seconds to reset the whole machine. The impulses are common to a complete equipment of counting machines so that they will all reset together.

Figs. 9, 10 and 11 show a transmission unit, such as one of the units 15 or 16, with an indicator control apparatus of another type, in place of drum 67, wherein the spider 107 earths contacts 108 in turn so that ten wires leading to each digit would be required, the ten contacts 108 being housed in the upper half of the distributor 109. There are also nine contacts 110 in the lower half of the distributor, however, and these are commoned to serve the same purpose as the wipers 100 to 106, providing an earth for the reset impulses until the spider 107 is in the zero position when none of the four brushes 111 is earthing the lower contacts.

What I claim is:

1. In a counting machine having a plurality of interconnected denomination spindles of different denomination adapted to register values of progressively higher denomination, including means for transferring values from a denomination spindle of lower value to a denomination spindle of higher value, means including a slipping clutch or equivalent device for urging each denomination spindle to rotate, and means for controlling the rotation of a higher denomination spindle including an escapement wheel on the higher denomination spindle adapted to be released by a mechanism associated with a lower denomination spindle, the improvement comprising a releasing mechanism for the escapement wheel including two separately spring-actuated escapement pawls arranged to engage opposite sides of the wheel, and a pair of cams respectively engaging said pawls, each cam having a pawl-engaging surface for releasing the pawl to permit rotation of the escapement wheel, said surface including a substantial arc of rotation through which the pawl is depressed with respect to the escapement wheel to permit effective and accurate transfer to take place, one pawl being held in readiness to check rotation of the escapement wheel after rotation through one-half the distance between adjacent teeth of the wheel when the wheel is released by the other pawl.

2. In a counting machine having a plurality of interconnected denomination spindles of different denominations adapted to register values of progressively higher denominations, a mechanism actuated by a spindle of lower denomination for releasing a spindle of higher denomination for rotation, comprising a pair of escapement wheels mounted on the spindle of higher denomination, regularly spaced teeth on the escapement wheels, a pair of cam wheels mounted on and rotated by the spindle of lower denomination, each of the pair of cam wheels having two release positions at 180° with respect to each other, a pair of pivoted transfer levers operatively associated with each escapement wheel, each lever of each pair having an arm adapted to engage the teeth of the escapement wheel with which it is associated, one lever of each pair having an arm engaging one of said cam wheels while the other lever of each pair has an arm engaging the other cam wheel, one of the arms engaging the teeth of each escapement wheel being held in readiness to check the escapement wheel when the wheel is released by the arm of the other lever associated with said escapement wheel.

3. A counting machine as claimed in claim 2, characterized in that the release positions of one cam wheel are located at 90° with respect to the release positions of the other cam wheel.

4. A counting machine as claimed in claim 3, characterized by including a differential gear unit mounted on the spindle of higher denomination between said escapement wheels, the sides of said differential gear unit being respectively connected to the escapement wheels for transmitting rotary motion to said spindle of higher denomination.

5. In a counting machine having a plurality of interconnected denomination spindles of different denomination adapted to register values of progressively higher denomination, including means for transferring values from a denomination spindle of lower value to a denomination spindle of higher value, means including a slipping clutch or equivalent device for urging each denomination spindle to rotate, and means for controlling the rotation of a higher denomination spindle, the improvement in which said last means includes a pair of escapement wheels on the higher denomination spindle adapted to be released by a mechanism associated with a lower denomination spindle, and a differential gear coupling said escapement wheels to the higher denomination spindle, said mechanism including a pair of separately actuated escapement pawls operatively associated with the lower denomination spindle and mounted for engagement with opposite sides of each escapement wheel, one pawl of each pair being held in readiness to check rotation of the escapement wheel associated therewith when the wheel is released by the other pawl of the pair.

JOHN HANDLEY.

REFERENCES CITED

The following references are of record in the file of this patent:

UNITED STATES PATENTS

| Number | Name | Date |
|---|---|---|
| 1,112,063 | Goldberg | Sept. 29, 1914 |
| 1,165,337 | Mays | Dec. 21, 1915 |
| 1,203,049 | Recke | Oct. 31, 1916 |
| 1,880,422 | Daly et al. | Oct. 4, 1932 |
| 1,938,526 | Limb | Dec. 5, 1933 |
| 2,100,164 | Handley | Nov. 23, 1937 |
| 2,124,697 | Handley | July 26, 1938 |
| 2,190,710 | Furber | Feb. 20, 1940 |
| 2,312,342 | Lang | Mar. 2, 1943 |

FOREIGN PATENTS

| Number | Country | Date |
|---|---|---|
| 260,672 | Germany | Mar. 1, 1912 |